Figure 1:
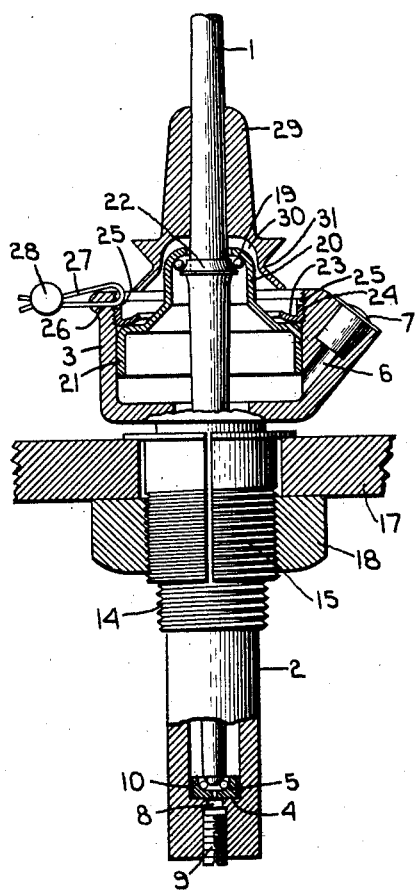

T. M. PRUDDEN.
BALL BEARING SPINDLE.
APPLICATION FILED AUG. 29, 1919.

1,389,009.

Patented Aug. 30, 1921.

Inventor.
Theodore M. Prudden
by Heard Smith & Tennant
Attys.

UNITED STATES PATENT OFFICE.

THEODORE M. PRUDDEN, OF NEWTON, MASSACHUSETTS.

BALL-BEARING SPINDLE.

1,389,009.   Specification of Letters Patent.   Patented Aug. 30, 1921.

Application filed August 29, 1919. Serial No. 320,674.

*To all whom it may concern:*

Be it known that I, THEODORE M. PRUDDEN, a citizen of the United States, resident of Newton, county of Middlesex, State of Massachusetts, have invented an Improvement in Ball-Bearing Spindles, of which the following description, in connection with the accompanying drawing, is a specification, like characters on the drawing representing like parts.

This invention relates to improvements in spindle constructions and the principal object thereof is to provide a relatively inexpensive spindle bearing preferably of a ball bearing type which will be effective in operation and of durable construction.

One of the objects of the invention is to provide a cushioned lower or step bearing for the spindle which desirably is supported directly or indirectly from the lower wall of the chamber of a spindle supporting member or bolster.

Another object of the invention is to provide a spindle with a bearing or bearings which are formed of coöperating thin hardened metal supported by relatively thick walls of bearing members having proper form for said bearings so that the material of said thickened walls will cause the hardened metal wearing members to conform to the proper shape of the bearing and will hold them in said shape.

Another object of the invention is to provide a ball bearing spindle in which the wearing members are made of steel which is carbonized before final machining and hardened after the final machining so that the grinding of the bearing surfaces is unnecessary.

A further object of the invention is to provide means for mounting the spindle upon its supporting means in such a manner that the base of the spindle is permitted to have a gyroscopic movement.

A further object of the invention is to provide a ball bearing spindle with an upper ball bearing which is substantially in the line of the pull of the band upon the whirl and which produces a downward pulling force upon the spindle blade thereby retaining the base of the spindle firmly in contact with its lower supporting bearing and insuring the proper rotation of the spindle.

A further object of the invention is to provide a ball bearing for a spindle in which the lower end of the spindle may be permanently supported, preferably by an antifriction step bearing with an upper ball bearing having adjusting means by which it may be properly positioned in respect to the lower bearing and locked therein, thus providing a structure which may be assembled by a skilled workman at the factory and the tampering of unskilled operators with said bearing prevented.

A further object of the invention is to provide a bolster for said ball bearing spindle with means for enabling the oil contained in the bolster to be drawn off.

Other objects and features of the invention will more fully appear from the following description and the accompanying drawings and will be pointed out in the annexed claims.

Figure 2:
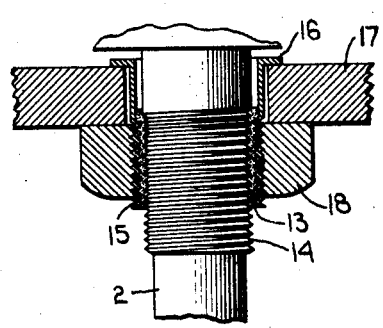
Figure 3:
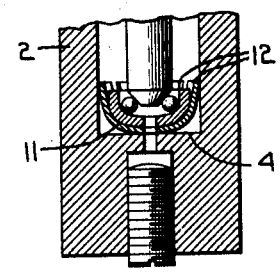
Figure 4:
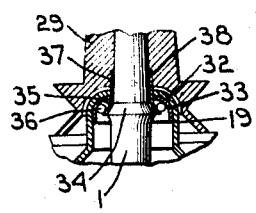

A preferred embodiment of the invention is illustrated in the accompanying drawings in which, Figure 1 is a view partly in elevation and partly in vertical section of a ball bearing spindle construction, Fig. 2 is a detail view partly in vertical section illustrating the connection between the bolster, bolster casing and the rail which supports the bolster casing, Fig. 3 is a detail vertical sectional view of the lower end of the bolster showing the duct for permitting the oil to be drawn off from the chamber of the bolster, and, Fig. 4 is a detail view in vertical section illustrating a preferred form of ball bearing in which the cone and cup of said bearing are provided with thin hardened metal surfaces forced upon said cone and into said cup to conform to the surface thereof.

The preferred embodiment of the invention illustrated herein comprises a spindle blade 1 and a supporting member or bolster 2 having an upper chambered cylindrical portion 3 and a downwardly extending chambered stem, the end wall 4 of which terminates short of the bolster but provides a seat for the lower or step bearing 5 for the spindle blade 1.

The upper cylindrical portion of the bolster is provided with an oil duct 6 which may be conveniently closed by a plug or cap 7 which may be removed to permit oil to be introduced into the bolster chamber. The lower end of the bolster stem is provided with a duct 8 through which the oil may be drawn off from the bolster, said duct being desirably closed by a screw 9 or other sealing means so that the oil may be retained within said bolster.

The lower bearing 5 preferably is in the form of a cup shaped ball race, the upper periphery of which is smaller than the diameter of the chamber in said bolster stem and cushioning means are interposed between the wall of the bolster and the parallel wall of the bearing. This cushioning means may be in the form of a layer 10 of leather or other suitable packing but preferably is in the form of a spring having a basal portion 11 resting upon the wall 4 at the end of the bolster chamber and having arms 12 engaging the peripheral wall of the bearing 5, and that of the bolster chamber. In the operation of the spindle the lower bearing is allowed to creep and by interposing the hardened steel central portion of a spring between the bearing and the end wall of the bolster chamber wearing of the lower wall of the bearing 5 is reduced to a minimum.

The spring arms 12 serve to permit a slight gyroscopic movement of the lower end of the spindle which tends to make it self centering.

In order alternatively to provide for the gyroscopic movement of the base of the spindle the stem 2 desirably is supported by resilient means interposed between the bolster stem and the casing. A convenient and relatively inexpensive means for accomplishing this purpose which is illustrated herein comprises a packing 13 of fibrous material interposed between the portion 14 of the bolster stem and a screw threaded split sleeve 15 having a flanged upper end 16 which rests upon the rail 17 or other support for the spindle mount.

By thus providing a split sleeve the packing can readily be introduced between the sleeve and the stem of the bolster. A nut 18 engaging the screw threaded outer wall of the split sleeve 15 may be utilized to clamp the sleeve which constitutes the bolster casing upon the rail 17 and also to secure the split sleeve firmly upon the bolster stem.

A further feature of my invention consists in so constructing the upper ball bearing cup that it may be readily formed preferably from pressed or stamped metal and desirably is so constructed that it may be adjusted properly in relation to the coöperating cone and locked in adjusted position against tampering by unauthorized persons.

In the preferred embodiment of the invention illustrated in Fig. 1 the cup bearing is pressed or stamped to form a ball race 19 having a downwardly or outwardly extending wall 20 terminating in a cylindrical skirt 21 which fits the cylindrical wall of the chambered upper portion of the bolster. This fit preferably is such as to permit a creeping of the ball race to insure an even wearing of the race.

Suitable means are provided for adjustably securing the ball race in proper relation to the cone 22 with which it coöperates. A convenient means which is illustrated herein comprises a ring 23 having suitable screw threads 24 engaging complementary screw threads within the wall of the upper cylindrical portion of the bolster but it will be understood that the ring may be so formed as to screw upon the outside of the bolster rather than the inside. By screwing down the ring the proper adjustment between the cup ball race and its coöperating cone may be readily effected.

Suitable means may be provided for locking the ring in adjusted position. As illustrated herein the ring is provided with a series of recesses 25 and the upper cylindrical portion of the bolster is provided with apertures 26 so that when the recesses 25 are caused to register with the apertures 26 a locking wire 27 may be passed through them and its ends secured together by a suitable seal 28, alternatively the ring may be locked in place by a set screw passing through the wall of the bolster or in any other suitable manner.

The usual whirl 29 which is fixedly secured upon the spindle is provided with a chambered lower portion 30 which is adapted to fit over the upper ball bearing in such a manner that the bottom 31 of the band pulley groove therein will lie substantially in the plane of the ball race, the construction being such that when the spindle is subject to the force imposed by the pull of the band during its driving operation a component of said force will act downwardly upon the spindle thereby forcing its lower end upon the step bearing and thus insuring the proper support of the spindle by both the upper and lower bearings.

In order to provide a relatively cheap and accurate bearing having hardened wearing surfaces and to avoid the necessity of accurate machining and mounting of the hardened bearing surface the members of the bearings are formed of relatively soft material and bearing rings of relatively hard material applied to them and so forced upon them as to cause them to conform to the surface of the softer metal parts so that any distortion of the hardened bearing rings which may result from the hardening process will be corrected and said hardened rings caused to present accurate bearing surfaces. Such bearing surfaces may be applied to either cup or cone bearings. In the construction illustrated in Fig. 4 hardened bearing rings are illustrated as applied to both the cup and cone members of the bearing. In this construction the cup race 19 is formed by pressing or stamping and is provided with a bearing surface 32 which is carefully machined. A thin ring 33 of high grade steel is suitably formed and hardened after final machining and is then pressed firmly into the bearing 32 formed in the cup member 19 so that any distortion which may result from the hardening process is compensated for and the wearing ring 33 caused to present an accurate bearing surface. A thin hardened ring 35 of steel is similarly forced downward upon the spindle until it fits accurately upon the surface 34 of the cone. Similarly any distortion of this ring is corrected so that it presents a proper bearing surface to engage the balls 36. Alternatively the bearings may be formed of relatively thick walls and the wearing surfaces thereof carbonized before final machining and hardened after final machining.

Preferably the bearing ring 35 for the spindle is provided with a substantially cylindrical extension 37 which extends upwardly beyond the cup bearing and is engaged within a suitable recess 38 in the lower portion of the whirl 29. By providing a tight fit the whirl may be caused also to clamp the wearing ring 35 upon the spindle blade.

It will be understood that the embodiment of the invention disclosed herein is illustrative but not restrictive and that various modifications in construction and arrangement of parts may be made within the meaning and scope of the following claims.

Having thus described my invention what I claim as new and desire to secure by Letters Patent is:

1. A spindle bearing comprising a bolster having a cup shaped portion at its upper end, a ball race slidably fitted in said cup shaped portion and an adjustable means for securing said ball race in place.

2. A spindle bearing comprising a bolster having a chambered cylindrical upper portion, a ball race having a cylindrical portion slidably fitted in said cylinder, and adjustable means for retaining said ball race in place.

3. A spindle bearing comprising a bolster having a chambered cylindrical upper portion, a ball race having a cylindrical flange slidably fitting said cylindrical portion and an adjustable securing ring therefor having a screw threaded periphery and engaging complementary screw threads on the cylindrical portion of said bolster.

4. A spindle bearing comprising a bolster having a chambered cylindrical upper portion, a ball race having a cylindrical flange slidably fitting said cylindrical portion and an adjustable securing ring therefor having a screw threaded periphery and engaging complementary screw threads on the cylindrical portion of said bolster and means for locking said ring against rotation.

5. A spindle bearing comprising a bolster having a chambered cylindrical upper portion, a ball race having a cylindrical flange slidably fitting said cylindrical portion and a ring having a screw threaded means engaging complementary screw threads on the cylindrical portion of said bolster, said ring being provided with a plurality of recesses and a complementary recess on said cylindrical portion adapted when in registry with a recess of said ring to receive a locking member.

6. A spindle bearing comprising a bolster having a hollow cylindrical upper portion, a separate metal ball race having a flange seated in said cylindrical portion, the ball race being located at a distance above the top of said cylindrical portion, a spindle in said bolster having a cone adapted in cooperation with said ball race to provide an upper ball bearing for said spindle, a lower step bearing for said spindle and means for adjustably securing said upper ball bearing in the cylindrical upper portion of said bolster whereby the proper adjustment of the spindle in its ball bearings may be secured.

7. A spindle bearing comprising a bolster having a hollow cylindrical upper portion, a separate metal ball race having a flange seated in said cylindrical portion, the ball race being located at a distance above the top of said cylindrical portion, a spindle in said bolster having a cone adapted in cooperation with said ball race to provide an upper ball bearing for said spindle, a lower step bearing for said spindle and means for adjustably securing said upper ball bearing in the cylindrical upper portion of said bolster whereby the proper adjustment of the spindle in its ball bearings may be secured, and a whirl on said spindle having a central recess inclosing said upper ball bearing whereby the central plane of the groove of said whirl will be substantially in the same plane as the ball bearing.

8. A spindle bearing comprising a bolster having a screw threaded stem, a spindle rotatably mounted in said bolster, a bolster casing comprising a split sleeve casing having internal and external screw threads, a resilient packing intermediate of the screw threads of said bolster, and said bolster casing and nut engaging the exterior screw threads of said bolster casing adapted to secure said bolster casing to a supporting member.

9. A spindle construction comprising a spindle blade and a chambered spindle supporting member, a ball bearing, a whirl having its groove in the plane of said ball bearing, a thrust bearing for the base of the spindle blade in said chamber and cushioning means between said thrust bearing and spindle supporting member adapted to permit limited lateral movement of said thrust bearing.

10. A spindle construction comprising a spindle blade and a chambered spindle supporting member, a thrust bearing for the base of the spindle blade in said chamber and a cushioning spring in said chamber having arms engaging the sides of said bearing.

11. A spindle construction comprising coöperating bearing members having bearing surfaces formed of thin hardened metal rings forced upon said bearing members and caused thereby to conform accurately to the contour of said bearing members whereby any distortion of said hardened rings is corrected and an accurate bearing surface presented.

12. A ball bearing spindle comprising a cup bearing accurately formed of relatively soft metal and a thin ring of hardened metal conforming to said cup bearing forced therein and thereby caused to conform to the contour of said cup bearing whereby an accurate bearing surface is presented.

13. A ball bearing spindle comprising a spindle having a conical bearing member accurately formed thereon, a ring of thin hardened material conforming to said conical bearing member forced thereon and thereby caused to conform to the contour of said conical bearing member whereby an accurate bearing surface is presented.

14. A ball bearing spindle comprising a spindle having a conical bearing member accurately formed thereon, a ring of thin hardened material conforming to said conical bearing member forced thereon and thereby caused to conform to the contour of said conical bearing member whereby an accurate bearing surface is presented said ring having an extension fitting said spindle and a whirl tightly embracing said extension.

15. A spindle bearing comprising a bolster having a chambered stem, a laterally movable step bearing in said chamber, the lower portion of said stem having an oil discharge duct communicating with said chamber and removable means for closing said duct.

In testimony whereof I have signed my name to this specification.

THEODORE M. PRUDDEN.